United States Patent Office 3,285,877
Patented Nov. 15, 1966

3,285,877
PROCESS FOR THE POLYMERIZATION OF MONOMERIC FORMALDEHYDE
Ernst-Ulrich Köcher, Kuno Wagner, and Rudolf Haupt, Leverkusen, Germany, assignors to Farbenfabriken Bayer Aktiengesellschaft, Leverkusen, Germany, a German corporation
No Drawing. Filed Mar. 6, 1963, Ser. No. 263,137
Claims priority, application Germany, Mar. 10, 1962, F 36,250
7 Claims. (Cl. 260—67)

This invention relates to the production of high molecular weight polyoxymethylenes and more particularly, it relates to an improved process for the production of high molecular weight polyoxymethlyenes by polymerizing monomeric formaldehyde containing 0.3 to 5 percent of water in a gaseous phase.

Processes have been known, heretofore, by which monomeric formaldehyde is polymerized in a liquid monomeric polymerization medium containing suitable polymerization catalysts. These processes have the disadvantage that they require costly measures for isolating the polyoxymethylene which is formed and for working up the solvents.

It has also been known from the U.S. Patent No. 3,005,799 to polymerize monomeric formaldehyde in the absence of solvents. These processes are based on the use of activated surfaces of metals, more especially aluminium, and also on the use of metal compounds as catalysts. Required for carrying out these processes is a formaldehyde which is as far as possible anhydrous and which is advantageously coducted at temperatures between −20 and +35° C. over the possibly activated catalyst surface.

In this case, a layer of polyoxymethylene is deposited on the contact surface and the said layer can only be removed mechanically. One particular disadvantage of these processes is based on the control of the temperature, which is difficult to manipulate, since the dissipation of the very high heat of polymerization is only satisfactory with a small formaldehyde conversion on account of the forming wall coatings of polyoxymethylene.

Furthermore it has been known to cause the polymerization of the formaldehyde in the gas phase by simultaneous introduction of gaseous formaldehyde and polymerization catalysts in vapour or aerosol form. This method of procedure requires the use of highly purified formaldehyde, since otherwise no polyoxymethylenes of high molecular weight are formed. Other proposals concerned with carrying out the polymerization of formaldehyde involve the use of a topochemical reaction between already produced polyoxymethylene and other solid bodies and anhydrous pure formadehyde gas, with the use of special catalysts (see U.S. Patent 3,005,799) as well as Belgian patent specifications 600,609, 601,983 and 604,972.

All prior processes have the decisive disadvantage that it is necessary to employ highly purfied, dehydrated formaldehyde for the polymerization. However, the obtaining of highly purified formaldehyde is difficult and complicated; it requires complicated installations and complicated processes and even then is only possible if high losses of formaldehyde are accepted.

It has now been found that also an impure and more especially water-containing formaldehyde can be used for the production of polyoxymethylenes of high molecular weight in the absence of solvents or other liquid polymerization media. According to the invention, the procedure adopted is that formaldehyde with a content of about 0.3–5% and advantageously 0.8–3% of water is polymerized in the gas phase while being conducted over initially supplied or initially formed polyoxymethylene, advantageously in the presence of metal-containing catalysts. Other objects of the invention will appear hereinafter.

According to one preferred form of the invention, the initially supplied and the newly produced polyoxymethylene are constantly kept in violent motion, so that the polymerization of the supplied formaldehyde takes place in a fluidized or fluid bed of initially supplied and newly formed polyoxymethylene without any caking of the initially supplied material taking place. It is found that there is practically no wall polymerization with this working method and thus the apparatus remains free from solid polyoxymethylene depositions. The necessary vigorous movement of the polyoxymethylene can be produced in various ways, as by violent mechanical stirring with stirrer devices of suitable form, or by means of other rotation systems using centrifugal force, by means of rotary cylinders filled with balls, such as are known in connection with ball mills, by means of vibrators or by continuous injection of a gas, as which can for example be employed nitrogen or an inert, vaporized, organic solvent with a boiling point below the polymerization temperature and/or the monomeric gaseous formaldehyde itself. Several of these methods of movement can advantageously be combined with one another. It is of primary importance that the form and design of the apparatus are adapted to such methods. The addition of inert gases or vapours can moreover advantageously serve for dissipating the heat of polymerization or a part thereof.

The initially supplied polyoxymethylene can consist of a polyoxymethylene of the same molecular weight range, which is to be produced by polymerization of the gaseous formaldehyde (intrinsic viscosities of about $$\ln \eta/c = 0.5\text{--}1.2)$$

However, it is also possible to use polyoxymethylenes of lower molecular weights (corresponding to intrinsic viscosities of $\ln \eta/c = >0.2$), but these are generally used in relatively small quantities in order to avoid a disadvantageous influencing of the properties of the final product. Instead of the polyoxymethylene, it is also possible to employ polyoxymethylenes being acylated or alkylated at the terminal hydroxyl groups of the polymer chain more especially polyoxymethylene diacetate.

The polymerization can be carried out at temperatures up to the decomposition temperature of the polyoxymethylene under a given pressure; applicable as lower temperature limit is the boiling temperature of the liquid formaldehyde under the given pressure conditions. However, the preferred temperature range is between approximately 30° C. and 110° C. In relatively small installations, the polymerization is advantageously carried out under normal pressure; reduced pressure is possible and may produce certain advantages. On the other hand, increased pressures up to for example 3 atmospheres may be advantageous in order to reduce the dimensions of installations with a relatively high capacity or to increase the throughput, or even to render possible higher polymerization temperatures.

The formaldehyde to be polymerized can be of any desired origin. A very important advantage of the process according to the invention consists in that the necessary degree of purity of the formaldehyde is relatively low; specifically, the standards as regards purity depend on whether and what catalysts are used. In principle, it is desirable that the methanol or formic acid content is as low as possible ($CH_3OH<0.2\%$; $HCOOH<0.02\%$), these compounds are effective chain-breaking agents which prevent the production of good yields of polyoxymethylene of high molecular weight which can be used industrially. Much less critical is the quantity of water, especially when using catalysts which are relatively insensitive to water, such as compounds of divalent tin.

Relatively high quantities of water of more than 0.5% up to 1–2% can also be contained in the formaldehyde when working without any catalyst; nevertheless, it is necessary in such a case to select a highest possible polymerization temperature (above 65° C.) and to conduct an inert gas stream through the reaction vessel in order constantly to remove the water from the reaction chamber. Moreover, the content of substances which increase the natural dissociation of the water, that is to say, the content of acids and bases in the widest sense, should be as low as possible, since otherwise the presence of relatively large quantities of water contributes to the intensified breaking of the chain.

In the case where highly active metal catalysts are used, the water content of the formaldehyde can be up to 5%, it also being possible to produce the good yield of polyoxymethylene of high molecular weight and of a highly uniform nature.

Crude or partially purified formaldehyde can be obtained in a simple manner; among the known processes, the following are to be mentioned as examples: the pyrolysis of paraformaldehyde, possibly with subsequent initial polymerization of the pyrolysis gases in a preceding cooling vessel, washing arrangement or other absorption system which is not to contain more than 10% of the formaldehyde introduced.

For carrying out the process according to the invention in a preferred manner, it is possible in principle to make use of all known metal catalysts, with the limitation that the polymerization cannot be carried out at temperatures above 30° C. with those catalysts which then catalyze to an appreciable degree also the formation of methanol and formic acid or methyl formate by a Cannizaro reaction. Included in the latter are the oxides, hydroxides and hydrated oxides of certain metals, more especially aluminium, and also metals as such, where they are known for their catalytic co-operation in Cannizaro reactions. Included herein are again primarily aluminium and its alloys, especially in an activated, e.g., amalgamated form. The known catalysts suitable for the process according to the invention includes more especially metal salts and organometallic compounds. Particularly suitable are compounds of divalent tin, divalent zinc and/or trivalent antimony, of copper, cadmium and/or bismuth, i.e., those which permit, with known processes for solvent polymerization, the use of a formaldehyde which is relatively highly contaminated with more especially water and methanol. Compounds of divalent tin are preferred. In general, there are also to be considered those metals of which the hydroxides in water are practically not dissociated or have an amphoteric character. Suitable catalysts are for example the catalysts disclosed in U.S. Serial Nos. 134,868, now abandoned, and 182,641.

Examples of the divalent tin compounds are: tin-II-hydroxide, tin-II-cyanate, tin-II-rhodaade, tin-butyrate, tin-octoate (ethyl hexanoic acid), tin-stearate, tin-oleate, tin-bis-dithio-carbonate, tin-bis-xanthogenate, tin salts of the monoester of carbonic acids, tin salts of phenols or thiophenols and tin-II-alkoxides.

The process can be carried out intermittently or continuously and the catalyst can be added in various ways. When operating intermittently, it is sufficient for the initially supplied material to be treated beforehand with a solution of the catalyst and to be freed again from the solvent. The amount of catalyst being used in this process is in the range of about 0.01 to about 0.5 part of weight per 100 parts of weight of the initially supplied polyoxymethylene. When using this working procedure, depending on the choice of the catalyst and on the purity of the monomeric formaldehyde, it is possible for up to about 5 parts of the monomer to be polymerized per part of the initially supplied polyoxymethylene. The polyoxymethylene obtained according to the present process can likewise be used as a support. However, it is also possible and in fact is advantageous for the catalyst to be added continuously or at intervals, for example, by a part of the product obtained, branched off and charged with fresh catalyst, being conducted back into the reaction chamber, i.e., the fluidized or fluid bed, or by a dilute solution of the catalyst in a solvent, the boiling temperature of which is below the polymerization temperature, being sprayed into the reaction chamber. With such a method of procedure, the catalyst is deposited again on the polyoxymethylene in the fluidized bed in a small concentration, which can be determined by suitable choice of the concentration of the catalyst solution and the injection velocity, while the solvent evaporates and leaves the reaction chamber.

The highly crystalline polyoxymethylenes obtained according to the invention can thereafter be acylated or alkylated for increasing the thermostability in known manner and then be used as a thermoplastic material, perhaps after heat stabilizers, light stabilizers and antioxidants as well as pigments and/or fillers have been added in a manner known per se.

In the following examples, the parts are parts by weight, unless otherwise indicated. The given intrinsic viscosities have been determined in the following manner:

The time of flow of butyrolactone containing 0.5 percent by weight of polyoxymethylene is measured in a Ubbelohde-viscosimeter at a temperature of 150° C. The viscosity number [$\eta$] being identical with the intrinsic viscosity, is computed according to the following equations:

$$[\eta] = \lim_{c \to 0} \ln \eta_r/c$$

$$\eta_r = \text{relative viscosity} = \frac{\text{viscosity of the solution}}{\text{viscosity of the solvent}}$$

$$\eta = \frac{981 \cdot r^4 \cdot \pi \cdot h \cdot \rho \cdot t}{8 \cdot 1 \cdot V} - \frac{1,12 \cdot V}{8 \cdot \pi \cdot 1 \cdot t}$$

wherein $h$ means the effective high of the capillary tube in cm., $l$ the length of the capillary tube in cm., $r$ the radius of the capillary tube in cm., $V$ the volume of flow in cm.$^3$ and $t$ the time of flow in sec. In the present case the ratio $h/l$ is 1.25. $\rho$ is the density of the solution.

*Example 1*

100 parts of weight of polyoxymethylene having an intrinsic viscosity of 0.707 were treated with a solution of 0.25 part of tin-II-octoate in 200 parts by volume of methylene chloride, then freed from the solvent by suction-filtering and dried. This polyoxymethylene is initially placed in a cylindrical two-liter stainless steel vessel with a cooling jacket, stirrer mechanism, internal thermometer and having a cover which can be heated with steam and comprising a supply pipe and air-vent. While the material is kept in turbulent motion by the stirrer mechanism, particularly purified formaldehyde (0.6–1.5% of $H_2O$, <0.02% methanol) with a small addition of inert gas flows into the reaction vessel. The formaldehyde gas was produced by pyrolysis of paraformaldehyde and subjected to a partial purification by initial polymerization in a trap which is cooled with iced water and in which about 10% of the crude pyrolysis gases were condensed. By jacket cooling with water at a temperature of 60–65° C., the polymerization temperature is kept between 70 and 75° C. The inert gas discharging from the air vent contains practically no formaldehyde, that is to say, the formaldehyde gas introduced is almost quantitatively polymerized on to the initially supplied support material. The experiment is stopped when the polyoxymethylene obtained consists of about 50% of material added by polymerization. At this time, there were no solid wall coatings of polyoxymethylene. After the acetylation by boiling for 15 hours in acetic acid anhydride in the presence of catalytic quantities of sodium acetate, the product produced had an intrinsic viscosity $\ln \eta/c$ of 0.69, as compared with 0.707 of the initially supplied material.

*Example 2*

150 parts of a polyoxymethylene having an intrinsic viscosity of 1.18 and being prepared with 0.025 part of tin-octoate according to Example 1 are placed in the apparatus described in Example 1 and 190 parts of formaldehyde gas are polymerized thereon at 65–72° C. The formaldehyde gas was obtained by pyrolysis of paraformaldehyde and washing the pyrolysis gases in 6 series-connected cooled diisopropylbenzene washers, of which the last two had the temperature of −22° C. The practically anhydrous formaldehyde introduced into the polymerization vessel polymerized to about 97% on to the support material. The polyoxymethylene obtained had an intrinsic viscosity of $\ln \eta/c = 0.93$ (after acetylation). This example shows that the use of practically anhydrous formaldehyde does not produce any improvement as compared with the use of water-containing formaldehyde as in Example 1, and demonstrates the advantage of the process according to the invention.

*Example 3*

75 parts of acetyl polyoxymethylene having an intrinsic viscosity of 1.18 and being prepared with 0.025 part of tin-octoate according to Example 1 were initially placed in a vertical cylindrical reaction tube equipped with a vibration mixer. A mixture of formaldehyde gas, prepared according to Example 1 an inert gas was introduced at the bottom end of the reaction tube. The sealing of the reaction chamber from the gas supply pipe was produced by a heated copper perforated plate, through which the gases were able to enter the reaction chamber but the solid polyoxymethylene was not able to pass into the supply. The polymerization temperature was about 70–80° C., the heat of reaction being dissipated partly by air cooling and partly by the inert gas. 21 parts of formaldehyde gas polymerized on to the support material. At the upper and colder parts of the reaction tube, there was a slight degree of wall polymerization, which led to a thin, adhering polyoxymethylene covering.

The acetylated product had an intrinsic viscosity of $\ln \eta/c = 0.90$.

*Example 4*

100 parts of polyoxymethylene having an intrinsic viscosity of 0.707 and being prepared with 0.025 part of tin-octoate according to Example 1 were initially placed in the apparatus described in Example 1. At 75–80° C. about 100 parts of partially purified formaldehyde gas, (produced as in Example 1) with an addition of about 5% of nitrogen as inert gas were polymerized on said polyoxymethylene. On completion of the experiment, the apparatus did not show any adhering wall coatings of polyoxymethylene. The material obtained had an intrinsic viscosity of $\ln \eta/c = 0.65$ and the initially supplied material a viscosity of 0.707.

*Example 5*

74 parts of an acetylated polyoxymethylene having an intrinsic viscosity of 1.15 prepared with 0.025 part of tin-octoate according to Example 1 were initially placed in the apparatus according to Example 3 and partially purified formaldehyde gas was conducted therethrough as in Example 3. The intrinsic viscosity of the acetylated polyoxymethylene was $\ln \eta/c = 0.923$ and that of the initially supplied material 1.15.

*Example 6*

In an experiment carried out similar to Example 5, formaldehyde gas of the same degree of purity was polymerized in methylene chloride while cooling with ice and common salt. Triethylamine (0.4 part per 100,000 parts of solvent was used as catalyst. In this case, a polyoxymethylene of low molecular weight which could not be used industrially was obtained and this polyoxymethylene had an intrinsic viscosity $\ln \eta/c$ of 0.08 after acetylation.

Example 6 shows that the use of conventional nitrogen bases as catalysts when polymerizing formaldehyde with a high water content leads to negative results. On the other hand, formaldehyde with the same degree of purity, using the process according to the invention, yields polyoxymethylene of high molecular weight which can be exploited industrially.

*Example 7*

100 parts of an anhydrous polyoxymethylene of high molecular weight (intrinsic viscosity of $\ln \eta/c = 1.18$ after acetylation) were intially placed in a cylindrical 2-liter glass vessel with a mechanical stirrer device, a steam-heated cover, a heated supply pipe and an air vent, the said polyoxymethylene having been treated beforehand with a solution of 0.25 part of tin-II-octoate in 200 parts by volume of methylene chloride, then freed from the solvent by suction-filtering and dried. In these examples, crude formaldehyde gas obtained by pyrolysis of paraformaldehyde and having a content of about 4.5% of water, 0.2% of methanol and 0.01% of formic acid was employed. Approximately the same quantity of formaldehyde gas was polymerized on to the support. The product obtained, after acetylation, had an intrinsic viscosity of $\ln \eta/c = 1.17$.

*Example 8*

100 parts of polyoxymethylene having an intrinsic viscosity of 0.55 were treated in the apparatus described in Example 1 with the crude formaldehyde gas used in Example 7. On commencing the introduction of the gaseous formaldehyde, a 0.1% solution of tin-II-octoate in methylene chloride was sprayed on by means of an atomizer nozzle. In this case, the vessel had already been preheated beforehand to a temperature of 60° C., so that the methylene chloride evaporated immediately after entering the reaction chamber. The catalyst quantity was 1.4‰, based on initially supplied material, which was distributed over altogether 5 spraying operations during the first section of the experiment, in the course of which 235 parts of formaldehyde gas were polymerized. The material was now divided, 100 parts being left in the reaction vessel and a sample of the remainder was acetylated in order to establish the intrinsic viscosity.

Another 110 parts of formaldehyde gas were now polymerized on to the material left in the reaction vessel, and once again 0.4% of tin-II-octoate, based on the now supplied polyoxymethylene, were added in 4 spraying operations. Thereafter, the polymer was again divided, 100 parts being left in the reaction vessel, while of the part removed, a sample was taken for acetylating and the viscosity thereof established. Then another 86 parts of formaldehyde were again polymerized while introduced the same quantity of catalyst. The following list gives the intrinsic viscosity of the separate fractions and the actual proportion of foreign material originally supplied as support.

| Material | Intrinsic viscosity [1] $\ln \eta/c$ n. 30' | Percent support |
| --- | --- | --- |
| Starting material | 0.550 | 100 |
| 1st Fraction | 1.025 | 30 |
| 2nd Fraction | 0.909 | 14.3 |
| 3rd Fraction | 1.008 | 7.7 |

[1] At 150° C., 0.5% in butyrolactone.

*Example 9*

100 parts of catalyst-free polyoxymethylene of high molecular weight (intrinsic viscosity of $\ln \eta/c = 0.707$ after previous acetylation) were initially placed in the apparatus of Example 1 and treated with crude formaldehyde gas (as in Example 7). 75 parts of monomeric formaldehyde polymerized thereon. The intrinsic viscosity of the polyoxymethylene obtained was ln $\eta/c=0.6470$, after the material had been previously acetylated. The yield with this acetylation was however only 65%, based on the material used for the acetylation, by comparison with yields between 75 and 98% with the other fluidized bed polymers. The acetylation yield can in this case serve as a standard as to how high is the proportion in the polymer of paraformaldehyde-like polyoxymethylenes of low molecular weight.

What we claim is:

1. The process for preparing high molecular weight polyoxymethylene by polymerizing monomeric formaldehyde which comprises maintaining initially supplied polyoxymethylene having an intrinsic viscosity from about 0.2 to 1.2 and having a catalytic amount of a divalent tin compound as catalyst for said polymerization supported thereon, as a fluidized bed within a reaction zone at a temperature of from about 30 to 110° C. while introducing gaseous monomeric formaldehyde containing from 0.3 to 5% by weight of water into said reaction zone and subsequently recovering the resulting high molecular weight polyoxymethylene.

2. The process of claim 1 wherein said water content is from 0.8 to 3% by weight.

3. The process of claim 1 wherein said catalyst is selected from the group consisting of stannous hydroxide and stannous alkanoate, the amount thereof being from about 0.01 to about 0.5 part by weight of the initially supplied polyoxymethylene.

4. The process of claim 1 wherein said catalyst is tin-II-octoate.

5. The process of claim 1 wherein a minor proportion by weight of a reaction inert gas is introduced into said zone during the course of the reaction.

6. The process of claim 1 wherein the initially supplied polyoxymethylene is acetylated polyoxymethylene having a viscosity of 0.65 to 0.85.

7. The process of claim 1 wherein the initially supplied polyoxymethylene is alkylated polyoxymethylene having an intrinsic viscosity of 0.65 to 0.85.

References Cited by the Examiner

UNITED STATES PATENTS

| | | | |
|---|---|---|---|
| 2,373,387 | 4/1945 | Elliott | 260—414 |
| 2,395,307 | 2/1946 | Weber et al. | 260—414 |
| 2,449,572 | 9/1948 | Welsh | 260—46.5 |
| 2,593,862 | 4/1952 | Eickmeyer | 260—67 |
| 2,848,437 | 8/1958 | Langsdorf et al. | 260—67 |
| 3,005,799 | 10/1961 | Wagner | 260—67 |
| 3,036,016 | 5/1962 | Gordon et al. | 252—429 |
| 3,118,859 | 1/1964 | Delassus et al. | 260—67 |
| 3,194,789 | 7/1965 | Oba et al. | 260—67 |

FOREIGN PATENTS 1,285,909   1/1962   France.

WILLIAM H. SHORT, *Primary Examiner.*

L. M. MILLER, *Assistant Examiner.*